Oct. 12, 1965 H. D. ERVIN 3,211,917

STATIC CONTROL SYSTEM

Filed Jan. 30, 1961 2 Sheets-Sheet 1

INVENTOR.
HAROLD D. ERVIN
BY George C. Thompson
agent

Oct. 12, 1965

H. D. ERVIN 3,211,917

STATIC CONTROL SYSTEM

Filed Jan. 30, 1961

2 Sheets-Sheet 2

HAROLD D. ERVIN
INVENTOR.

BY George C. Thompson
agent

United States Patent Office 3,211,917

Patented Oct. 12, 1965

3,211,917

STATIC CONTROL SYSTEM

Harold D. Ervin, Canoga Park, Calif., assignor, by mesne assignments, to TRW Inc., a corporation of Ohio Filed Jan. 30, 1961, Ser. No. 85,803
5 Claims. (Cl. 307—88)

Figure 1:
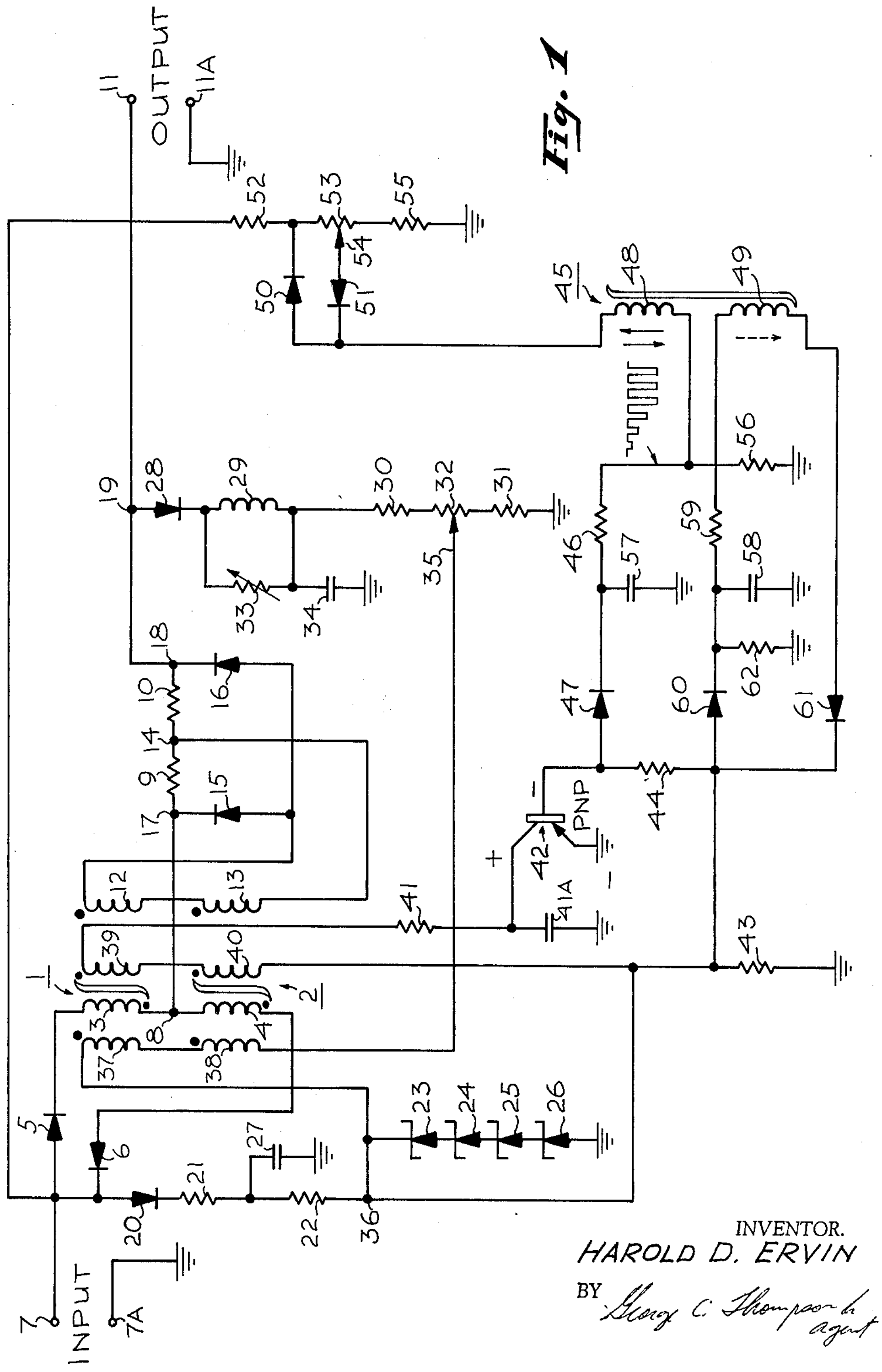

This invention relates to a static control system, and more particularly to a controlled magnetic core having square-loop characteristics capable of being controlled to remain unsaturated for extended periods of time.

Presently known techniques for providing long delay periods that extend into time delay periods of one or more minutes involve the use of mechanical relays or contactors which are controlled by thermostatic time delay devices. Such mechanical devices are obviously subject to relatively short life and may vary considerably in the accuracy of subsequent time periods during repeat cycles. In addition, systems of this nature involve the possibility of contacts becoming stuck or welded together, and inaccuracy due to arcs or dirt becoming lodged between the contacts, thus causing intermittent power transfer. In addition, such devices are sensitive to altitude, shock, and other environment conditions.

It is therefore an object of this invention to provide a static delay system capable of long delay periods without the use of mechanical moving parts.

It is another object of this invention to provide a static control system which functions as a sub-multiple oscillator system.

It is another object of this invention to provide a static control system which functions as an accurate polarity-sensitive counter system.

It is another object of this invention to provide a static delay system capable of a high degree of accuracy.

It is another object of this invention to provide a static delay system capable of being adjusted to the desired time delay period, which may be as long as several minutes.

It is another object of this invention to provide a static delay system capable of accurately repeating the selected time delay during successive time delay operations.

It is another object of this invention to provide a static delay system that is readily reset to the initial starting position for accurate subsequent operations.

It is another object of this invention to provide a static delay system capable of regulating the output load current to a desired maximum, even during overload conditions.

It is another object of this invention to provide a regulated output voltage capable of being adjusted to a level independent of the time delay periods.

It is another object of this invention to provide a static delay system capable of switching extremely high voltages without the possibility of contact breakdown due to switching such high voltages.

Other objects, purposes, and characteristic features will become obvious as the description of the invention progresses.

In practicing this invention, in one embodiment there is provided a square-loop core device provided with alternating input and output circuits, and a magnetizing means coupled to the core for controlling the rate and direction of saturation in response to a control means which is capable of attenuating one half-cycle more than the other half-cycle of each cycle of the alternating current applied to the magnetizing means. The amount of attenuation of the one half-cycle, with respect to the other half-cycle of the alternating current applied to the magnetizing means, provides a control of the delay to a selected desired period.

Figure 2:
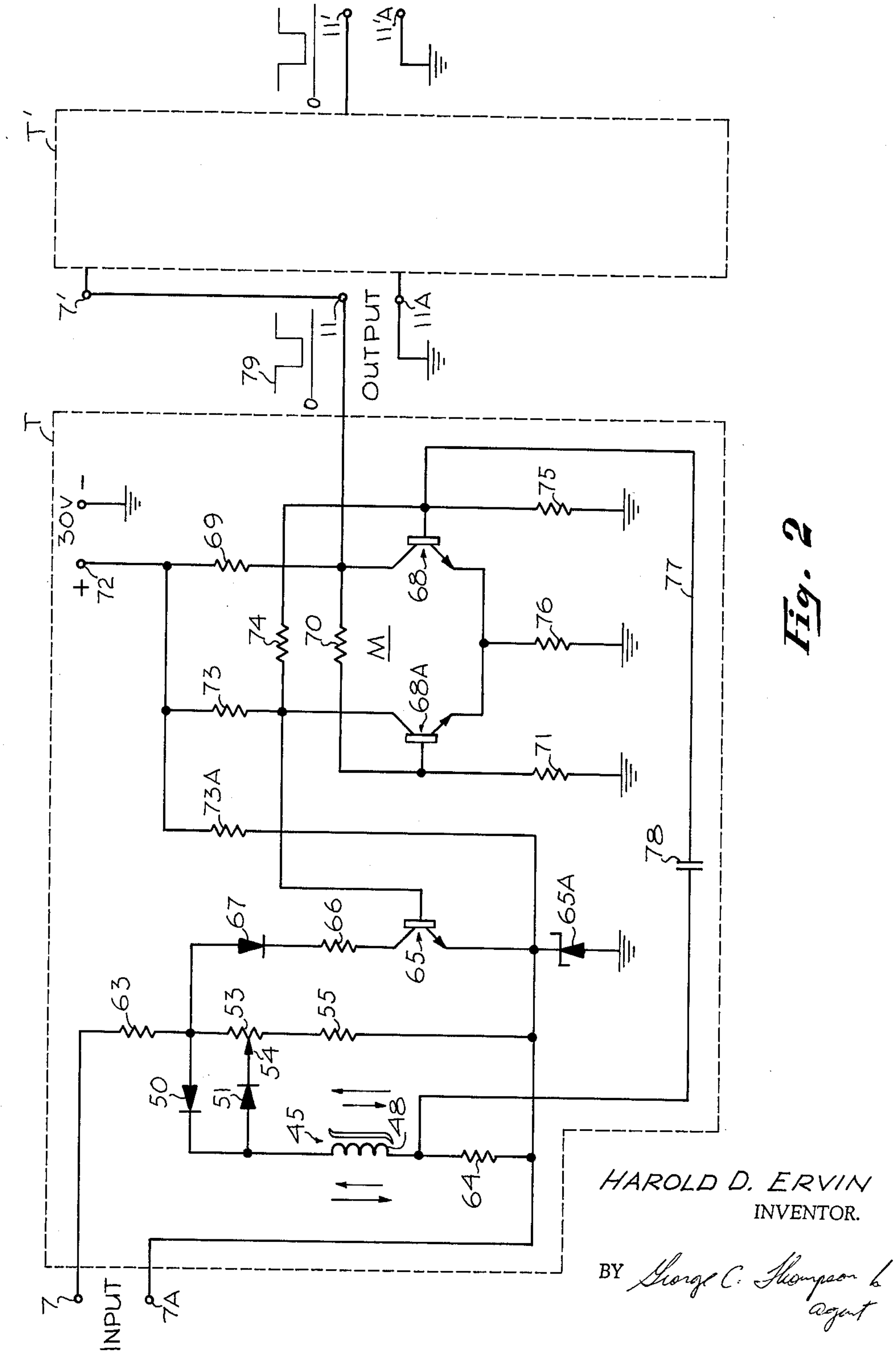

The objects of this invention may best be illustrated in detail by the following detailed description and the accompanying drawings, in which:

FIGURE 1 is a view of one embodiment of this invention, in which delays of several minutes may be obtained; and FIG. 2 is a view of another embodiment of this invention, in which relays of over 450 hours may be obtained.

In each of the several views similar parts bear like reference characters.

In the embodiment shown in FIG. 1, there is provided a pair of magnetic cores 1 and 2, each having square-loop characteristics capable of positive or negative saturation, depending upon the polarity of the input signal. The cores 1 and 2 are respectively provided with input windings 3 and 4, which windings are connected in series, with the series combination being connected across a pair of diodes or rectifiers 5 and 6. The diodes 5 and 6 are connected at their junction point to a common input terminal 7. The mid-point 8 of the series-connected windings 3 and 4 is connected through a pair of overload sensing resistors 9 and 10 to an output terminal 11. With the windings 3 and 4 series-connected with the oppositely poled diodes or rectifiers 5 and 6, it can be seen that, as long as the cores 1 and 2 have not reached positive or negative saturation, the voltage supplied on the positive half-cycle of the input voltage applied to the input terminal 7 is absorbed in magnetizing the core 1 through the rectifier 5 and winding 3, while the voltage supplied on the negative half-cycle of the input voltage from the terminal 7 is absorbed in the core 2 through the rectifier 6 and winding 4.

In addition to the overload resistors 9 and 10, there is provided a pair of windings 12 and 13 series-connected and wound about the cores 1 and 2, respectively. The series-connected windings 12 and 13 are also connected between the mid-point 14 and the junction point between a pair of series-connected back-to-back rectifiers 15 and 16. The pair of back-to-back rectifiers 15 and 16 are series-connected across the resistors 9 and 10 between the points 17 and 18. It can be seen, therefore, that if the resistors 9 and 10 are sufficiently small so as to provide only a small fraction of a volt change over each resistor during normal operation, the rectifiers 15 and 16 would thus normally prevent any flow of current between the points 14 and 17 and 14 and 18 through the windings 12 and 13 during the respective proper half-cycle of the supply voltage corresponding to the proper rectifier 15 or 16. If an overload occurs, however, the voltage drop across the resistors 9 and 10 becomes greater than the breakdown voltage of the rectifiers 15 and 16 on each of their respective half-cycles, and current flows through the windings 12 and 13 on each half-cycle. During the conduction of current through the windings 12 and 13, an opposing flux (noted by the polarity dot) is established in the cross 1 and 2, thus reducing the flow of current to the output terminal 11 by removing the cores from the saturation level.

In addition to overload protection, there is also provided output voltage regulation through the comparison of the output voltage at the terminal 19 with a reference voltage at the terminal 36. For this comparison, the input terminal 7 is connected to ground through a half-wave rectifier 20, a pair of series resistors 21 and 22, and a plurality of series-connected zener diodes 23, 24, 25, and 26. The number of series-connected zener diodes selected establishes a reference voltage level at terminal 36 which is used to provide a reference level about which the output terminal 11 voltage is adjusted. The direct current voltage developed by rectifier 20 is smoothed through the condenser 27 connected between ground and a point between the resistors 21 and 22. At the same time, the output voltage at the terminal 11 also occurring at the terminal 19 is also sampled through the diode 28 and passed to ground through the inductance 29, resistors 30 and 31, and potentiometer 32. The inductance 29 is provided with a variable shunt resistor 33 for controlling the inductance 29 effect through modification of its form factor. For additional smoothing of the output voltage, a capacitor 34 is connected in parallel with the series combination of resistors 30 and 31 and potentiometer 32. In order for the output voltage at terminal 11 to match the selected voltage established by the zener diodes 23 to 26, a variable terminal 35 of the potentiometer 32 is connected to a point 36 located between the resistor 22 and the zener diodes 23 to 26 through a pair of windings 37 and 38 series-connected and wound about the cores 1 and 2, respectively. It can be seen, therefore, that the reactance of the cores 1 and 2 would depend upon the comparison of the voltages occurring at the terminal 35 and at the point 36, since any difference between the two voltages would provide the proper polarity of current flow through the windings 37 and 38 to readjust the output voltage to the terminal 11 to cause a balance between the terminal point 35 and the terminal point 36.

In addition to the input windings 3 and 4, the overload control windings 12 and 13, and the voltage regulating windings 37 and 38 located on the cores 1 and 2, there is provided a pair of control windings 39 and 40 also series-connected and wound about the cores 1 and 2, respectively. The control windings 39 and 40 are connected between the point 36 and ground through a collector filter, including a voltage dropping resistor 41, capacitor 41A, and a suitable transistor 42, shown as a PNP type, although an NPN type may be used if the system polarities are reversed. During an initial time delay period, the transistor 42 is conducting in order for the control windings 39 and 40 to maintain the cores 1 and 2 in a flux state between positive and negative saturation levels. It can be seen, therefore, that the cores 1 and 2 will allow only a small amount of magnetizing voltage to appear at the terminal 11 so long as the cores have not been driven to either positive or negative saturation. Connected between the point 36 and ground, and therefore in parallel with the zener diodes 23 to 26, is a voltage establishing resistor 43 capable of providing the proper bias for the base of the transistor 42 through the resistor 44 to maintain the transistor 42 in conduction as long as little or no voltage pulses are provided by a timing or magnetizing rate controlling core 45 through a resistor 46 and diode or rectifier 47.

The core 45 is also a square-loop characteristic core and is provided with magnetizing winding 48 and a reset winding 49. The magnetizing winding 48 is connected at one end to the input source terminal 7 through a pair of oppositely poled rectifiers 50 and 51 and a voltage limiting resistor 52. The rectifier 51, in addition to being connected through the resistor 52 to the terminal 7 , is also connected through a potentiometer 53 with the rectifier 51 connected to a variable contact or tap 54 of the potentiometer 53. In order to maintain a stable voltage reference, the potentiometer 53 is connected through a resistor 55 to ground. It can be seen, therefore, that with this arrangement, on one half-cycle, the full input voltage of the point between the resistor 52 and potentiometer 53 is applied to the control winding 48 of the core 45. During the opposite half-cycle, however, the voltage level adjusted by the potentiometer variable tap 54 is fed to the rectifier 51, which voltage is slightly less than the voltage supplied through the rectifier 50. It can be seen, therefore, that during one-half cycle the core 45 is driven toward one saturation level a certain amount and during the following half-cycle is driven back away from that saturation an amount slightly less than the orginal half-cycle amount. As a result, the core 45 is actually driven a very small amount toward the one saturation during each cycle of the input voltage from the terminal 7.

The opposite end of the magnetizing winding 48 for the core 45 is connected to ground through a voltage regulating resistor 56. During the time that the core 45 is at some point between positive and negative saturation, the amount of pulse current received by the resistor 56 is very small. However, as the core 45 reaches satturation, at a time established by the potential selected by the potentiometer variable tap 54, the flow of current through the magnetizing winding 48 and resistor 56 to ground increases, and the proper polarity of these pulses is passed through the resistor 46 and rectifier 47 to bias the base of the transistor 42 to cause the transistor 42 to cease conduction. In order for the control current to the transistor 42 to be a substantially unidirectional current, the resistor 46 is coupled with the capacitor 57 connected between the resistor 46 and ground to filter the pulses coming through the control winding 48 of the core 45 to provide the desired unidirectional control voltage for the transistor 42.

Reset capacitor 58 is connected to discharge through a reset winding 49 and through resistor 59. Capacitor 58 provides a charge capable of causing a reset current to occur in the proper direction in the winding 49 upon the cessation of input voltage to the terminal 7. The reset charge on the capacitor 58 is provided by the voltage level established by the resistor 43 which is connected to the capacitor 58 through a rectifier 60. In order to insure that the reset current supplied by the capacitor 58 is of the proper polarity, an additional rectifier 61 is series-connected with the winding 49. In other words, elements 60 and 61 are blocking diodes for assuring that the only discharge path for capacitor 58 is through winding 49. It can be seen, therefore, that when the input voltage is interrupted at terminal 7, the capacitor 58 can discharge through the resistor 59 to the winding 49, through the rectifier 61 and resistor 43 to ground. In addition, some discharge of capacitor 58 takes place through the relatively high resistance of a regulating resistor 62.

The broad operation of this circuit is described as follows: With an alternating input voltage being applied between the input terminal 7 and a ground terminal 7A, it can be seen that a resultant magnetizing voltage is applied to the timing core 45 each cycle through the controlled timing rate selected by the potentiometer variable contact 54 to drive the core 45 to the proper saturation and cause the transistor 42 to cease conduction. At the same time, the cores 1 and 2, being in a flux state between positive and negative saturation, are absorbing or preventing the passage of the input voltage through the windings 3 and 4 to the output terminal 11, thus preventing an output from occurring between the terminal 11 and the ground terminal 11A. The cores 1 and 2 are maintained in this unsaturated flux state through the control windings 39 and 40, which are provided with sufficient current flow in the proper direction, by the transistor 42, to prevent saturation of these cores. At the end of the selected period, the timing core 45 reaches proper saturation and causes the transistor 42 to cease conduction, thereby inactivating the control windings 39 and 40. This enables the windings 3 and 4 to take control of the cores 1 and 2 to allow current flow from the terminal 7 through the windings 3 and 4 and the resistors 9 and 10 to the output terminal 11. This output voltage is sampled by the regulating diode 28, which provides an output voltage to the variable terminal or tap 35, which is compared with a reference voltage at terminal 36 through the voltage regulating windings 37 and 38. The windings 37 and 38 regulate the output voltage 11 to the selected value established by the variable tap 35 on the potentiometer 32.

As explained hereinbefore, the diodes 15 and 16 of the overload protection circuit do not conduct unless an overload occurs, in the output circuit at the terminal 11, which causes sufficient voltage drop across the resistors 9 and 10 to cause conduction through the diodes 15 and 16, respectively, which in turn causes current flow through the overload windings 12 and 13 causing the cores 1 and 2 to depart from their saturation level an amount sufficient to prevent high current flow to the output terminal 11. The high current flow is prevented by a flux level below saturation causing an increase in the reactance of the windings 3 and 4 to absorb the input voltage in the turns of the windings. Removal of the overload from the output terminal 11 would in turn drop the voltage across the resistors 9 and 10 to a level below the conducting level of the diodes 15 and 16, thus allowing the cores 1 and 2 to return to saturation and again provide normal output to the output terminal 11.

In the embodiment of FIG. 2, the winding 48 of the timing core 45 is shown connected between the input terminal 7 and the input terminal 7A through a resistor 63, oppositely poled diodes 50 and 51, and a resistor 64. Connected in parallel with the oppositely poled diodes 50 and 51, the magnetizing winding 48 of the core 45, and the resistor 64, are a potentiometer 53 and a series voltage divider resistance 55. The potentiometer 53 is provided with a variable tap 54 connected to the diode 51 for adjusting the voltage level of the half-wave voltage passed by the diode 51. In this arrangement, the voltage divider comprising the resistor 63, potentiometer 53, and resistor 55 establishes the voltage level to be applied across the winding 48 and resistor 64. As in the case of the timing core 45 in FIG. 1, the source voltage applied to the terminal 7 on one half-cycle, after passing through the resistor 63, is applied through the diode 50 to the winding 48 for driving the core 45 toward one saturation condition, and the other half-cycle of the applied voltage to the terminal 7 is applied to the core winding 48 through the resistor 63, the potentiometer 53, and the diode 51, as well as the series resistance 64, for driving the core in the opposite direction toward the opposite saturation. However, on the diode 51 conduction half-cycle, the voltage is somewhat less due to the added voltage drop of the potentiometer 63, and the net result is an incremental drive of the core 45 toward saturation during each cycle of the input voltage.

Connected in parallel with the portion of the voltage divider comprising the potentiometer 53 and the resistor 55 is an NPN-type switching transistor 65 series-connected with its collector voltage regulating resistor 66 and a polarity limiting diode 67. The diode 67, resistor 66, and transistor 65 provide a low resistance shunt path during the time that the transistor 65 is conductive. During the period that the core 45 is not in the proper saturation condition or during the period prior to any saturation, the transistor 65 is in the non-conductive state due to the bias applied to the base thereof, as explained hereinafter. The cut-off potential for the switching transistor 65 is maintained through the fact that the transistor 68 of a bistable multivibrator circuit M including transistors 68 and 68A is maintained in a cut-off or non-conductive state.

The multivibrator circuit M is initially established so that the transistor 68 is cut off and the transistor 68A is turned on or conducting. The initial conditions are established by the voltage divider bias circuit for transistor 68A including the resistors 69, 70, and 71 connected between the source terminals 72 and ground, and its relation to the voltage divider bias circuit including the resistors 73, 74, and 75 connected between the source terminal 72 and ground, with the base terminal of the transistor 68 connected between the resistors 74 and 75. With resistor 70 of the first voltage divider circuit being of lower resistance than the resistor 74 of the second voltage divider circuit and with the emitters of each of the transistors 68 and 68A connected in parallel and through a common voltage limiting resistor 76 to ground, the transistor 68A is conditioned to conduct, thus maintaining the transistor 68 in a non-conductive state. The transistor 68 is maintained in non-conductive state due to the fact that the collector of the transistor 68A is connected to a point between the resistors 73 and 74 in the base bias circuit of the transistor 68, thus causing a still further drop in the base voltage for the transistor 68 for maintaining the cut-off condition. Similarly, the collector circuit for the transistor 68 is connected between the resistors 69 and 70 of the base bias circuit of the transistor 68A so that during conduction of the transistor 68 the transistor 68A would be maintained in a cut-off condition.

The transistor 65 is maintained in its non-conducting state, since the base of the transistor 65 is connected through the resistor 73 to the source 72, and the emitter of the transistor 65 is maintained at an established voltage level above ground by a zener diode 65A with the emitter bias circuit completed through the resisitor 73A.

In the initial condition, however, with the transistor 68A biased to conduction and the transistor 68 turned off or non-conducting, and with the base of the transistor 65 connected to a point between the resistors 73 and 74, the resistor 73 causes a sufficient drop in voltage applied to the base of the transistor 65 during conduction of the transistor 68A to maintain the transistor 65 in non-conductive condition. It is necessary, therefore, for the transistor 68 to be turned on in order to cut off the transistor 68A to further cause the transistor switch 65 to become conductive in order to return the timing core 45 to its initial unsaturated condition. For this purpose, therefore, the base of the transistor 68 is connected through the conductor 77 to a point between the control winding 48 of the timing core 45 and the resistor 64.

Since the transistor 68 during the timing function of the timing core 45 is normally non-conductive, the collector is connected to the output terminal 11 to provide an output voltage equal to the voltage at the source terminal 72, less any voltage drop over the resistor 69 due to the voltage divider 70, 71 and the load applied to the terminal 11. As the winding 48 drives the timing core 45 to saturation, and upon reaching saturation, the source voltage applied to the terminal 7 is mostly dropped across the resistor 64, causing an output voltage pulse on the conductor 77 to be applied to the base of the transistor 68 through a coupling capacitor 78. The polarity of the voltage pulse applied to the resistor 64 is such that the transistor 68 is biased to conduction. More precisely, when the flux in core 45 has moved in small increments toward, for example, negative saturation, the saturation current through resistor 64 during negative half cycles becomes comparatively very large thereby providing positive pulse through line 77 to the base of transistor 68. Transistor 68 is thereby switched to the conductive state, causing transistor 68A to go to the non-conducting state, raising the voltage applied to the base of the transistor 65, and thus causing transistor 65 to become conductive. Conduction of the transistor 68 causes a large voltage drop across the resistor 69 and thus a drop in the output voltage to the terminal 11 to a level of substantially zero, as shown by the wave 79. Conduction of the transistor 65 causes half-cycle shunting of the input voltage from the terminal 7. That is, transistor 65 conducts and substantially short-circuits winding 48 during the half-cycles when the input voltage at terminal 7 is positive. During the negative half-cycles of the input voltage transistor 65 is "open." Accordingly, diode 51 conducts more current than diode 50. The half-cycles now applied to the timing core 45 are in a direction to drive the core away from negative saturation toward the opposite saturation. This condition exists until such time as the core becomes saturated in the opposite direction, at which time the polarity of the voltage across the resistor 64 is such as to cause the transistor 68 to cease conduction and the transistor 68A to again conduct, and consequently the switching transistor 65 to again become non-conductive. At this time the circuit has recycled and begins to again 'count' the input voltage pulses or cycles. Thus the switching of transistor 68 is time delayed by an interval dependent on the frequency of the input voltage and the setting of potentiometer 54.

The time delay, if the incoming source is 60-cycle, may be on the order of several minutes at the output terminal 11. If a greater accurate delay is desired, it is merely necessary to repeat the timing circuit shown by the dotted block T and shown repeated by the timing circuit in the block T' by connecting the block T' input terminal 7' to the output terminal 11 of the timing circuit block T, with the result that the output at the output terminal 11' can be delayed by more than 450 hours from the time the first input signal is applied to the input terminal 7 of the timing circuit block T.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. A static control system comprising: substantially square-loop characteristic core means; an alternating current source; magnetizing means inductively coupled to said core means and connected to said alternating current source for driving said core means to saturation in a selected polarity following a selected time period; said magnetizing means including control means for providing the selected time period through attenuating one half-cycle with respect to the other half-cycle of each cycle of the alternating current applied to said magnetizing means; output means connected to respond to said core means saturation for providing an output voltage change in response to saturation of said core means; and reset means for removing said core means from said selected polarity saturation, said reset means including a capacitor discharge circuit for providing a reset current of a polarity and magnitude sufficient for resetting said core means to an unsaturated condition.

2. A static control system comprising: substantially square-loop characteristic core means; circuit means including input terminals for application of alternating current input signals to the system; magnetizing means inductively coupled to said core means and connected to said terminals in a manner to utilize said alternating current input signals for driving said core means to saturation in a selected polarity following a selected time period; control means in said magnetizing means for providing the selected time period through attenuating one half-cycle with respect to the other half-cycle of each cycle of the alternating current applied to said magnetizing means; output means connected to respond to said core means saturation for providing an output voltage change in response to saturation of said core means; and reset means for removing said core means from said selected polarity saturation, said reset means including a switching means connected to respond to said core means reaching said selected polarity saturation to become conductive and attenuate said other half-cycle sufficiently to drive said core means from said selected polarity saturation.

3. A static control system comprising: substantially square-loop characteristic core means; circuit means including input terminals for application of alternating current input signals to the system; magnetizing means inductively coupled to said core means and connected to said terminals in a manner to utilize said alternating current input signals for driving said core means to saturation in a selected polarity following a selected time period; control means in said magnetizing means for providing the selected time period through attenuating one half-cycle with respect to the other half-cycle of each cycle of the alternating current applied to said magnetizing means; output means connected to respond to said core means saturation for providing an output voltage change in response to saturation of said core means; and reset means for removing said core means from said selected polarity saturation, said reset means including a switching means connected to respond to said core means reaching said selected polarity saturation to become conductive and attenuate said other half-cycle sufficiently to drive said core means from said selected polarity saturation, said switching means in said conductive state driving said core means to a saturation state opposite to said selected polarity saturation and means responsive to said opposite state of the core means for causing said switching means to return to the initial non-conductive state; said static control system being conditioned by said switching means and core means to return to original condition for repetition of the operating cycle whereby the system is operative as a frequency divider to repetitively provide a single cycle of output voltage change at said output means in response to a predetermined number of cycles of said alternating current input signal.

4. A static control system comprising: substantially square-loop characteristic core means; circuit means including input terminals for application of alternating current input signals to the system; magnetizing means inductively coupled to said core means and connected to said terminals in a manner to utilize said alternating current input signals for driving said core means to saturation in a selected polarity following a selected time period; control means in said magnetizing means for providing the selected time period through attenuating one half-cycle with respect to the other half-cycle of each cycle of the alternating current applied to said magnetizing means; output means connected to respond to said core means saturation for providing an output voltage change in response to saturation of said core means; and reset means for removing said core means from said selected polarity saturation, said reset means including a switching means connected to respond to said core means reaching said selected polarity saturation to become conductive and attenuate said other half-cycle sufficiently to drive said core means from said selected polarity saturation, said switching means in said conductive state driving said core means to a saturation state opposite to said selected polarity saturation and means responsive to said opposite state of the core means for causing said switching means to return to the initial non-conductive state; said static control system being conditioned by said switching means and core means to return to original condition to again repeat the operating cycle for acting as a submultiple oscillator; said switching means including a core means controlled bistable multivibrator repsonsive to the two saturated conditions of said core means for changing stable states.

5. A static control system comprising; substantially square-loop characteristic core means; circuit means including input terminals for application of alternating current input signals to the system; magnetizing means inductively coupled to said core means and connected to said terminals in a manner to utilize said alternating current input signals for driving said core means to saturation in a selected polarity following a selected time period; control means in said magnetizing means for providing the selected time period through attenuating one half-cycle with respect to the other half-cycle of each cycle of the alternating current applied to said magnetizing means; output means connected to respond to said core means saturation for providing an output voltage change in response to saturation of said core means; reset means for removing said core means from said selected polarity saturation; and means for causing said output voltage to return to its original amplitude in response to control by said reset means.

References Cited by the Examiner

UNITED STATES PATENTS

| | | | |
|---|---|---|---|
| 2,886,801 | 5/59 | Briggs | 340—174 |
| 2,980,846 | 4/61 | Ringelman | 307—88 |

IRVING L. SRAGOW, *Primary Examiner.*

JOHN F. BURNS, *Examiner.*